United States Patent
Savoie

(10) Patent No.: US 6,571,051 B2
(45) Date of Patent: May 27, 2003

(54) EDITING IMAGE DATA

(75) Inventor: Charles Savoie, Quebec (CA)

(73) Assignee: Autodesk Canada Inc., Quebec (CA)

( * ) Notice: Subject to any disclaimer, the term of this patent is extended or adjusted under 35 U.S.C. 154(b) by 0 days.

(21) Appl. No.: 09/126,687

(22) Filed: Jul. 30, 1998

(65) Prior Publication Data

US 2002/0076198 A1 Jun. 20, 2002

(30) Foreign Application Priority Data

Aug. 1, 1997 (GB) .......................................... 97 16 248

(51) Int. Cl.⁷ ................................................ H04N 5/93
(52) U.S. Cl. .................................................... 386/55
(58) Field of Search .............................. 386/46, 52, 55, 386/65; 345/328, 723

(56) References Cited

U.S. PATENT DOCUMENTS

| | | |
|---|---|---|
| 4,121,253 A | 10/1978 | McCoy |
| 4,855,834 A | 8/1989 | Cawley et al. |
| 4,954,898 A | 9/1990 | Nakata |
| 5,184,222 A | 2/1993 | Yanagisawa |
| 5,191,645 A | 3/1993 | Carlucci et al. |
| 5,237,648 A | 8/1993 | Mills et al. |
| 5,339,393 A | 8/1994 | Duffy et al. |
| 5,353,391 A | 10/1994 | Cohen et al. |
| 5,359,712 A | 10/1994 | Cohen et al. |
| 5,388,197 A | 2/1995 | Rayner |
| 5,404,316 A | 4/1995 | Klingler et al. |
| 5,442,744 A | 8/1995 | Piech et al. |
| 5,488,433 A * | 1/1996 | Washino et al. ............... 386/55 |
| 5,515,110 A | 5/1996 | Alig et al. |
| 5,568,275 A | 10/1996 | Norton et al. |
| 5,758,180 A | 5/1998 | Duffy et al. |
| 5,760,767 A | 6/1998 | Shore et al. |
| 5,781,188 A | 7/1998 | Amiot et al. |
| 5,786,814 A | 7/1998 | Moran et al. |
| 5,926,603 A * | 7/1999 | Tanaka et al. ................. 386/52 |
| 5,930,445 A * | 7/1999 | Peters et al. ................... 386/52 |
| 5,982,364 A | 11/1999 | Beckwith |
| 5,999,173 A | 12/1999 | Ubillos |
| 6,016,380 A * | 1/2000 | Norton .......................... 386/55 |
| 6,034,679 A * | 3/2000 | McGraph ...................... 345/328 |

FOREIGN PATENT DOCUMENTS

| | | | |
|---|---|---|---|
| EP | 0438061 A1 | 7/1991 | |
| EP | 0625781 A3 | 11/1994 | ......... G11B/27/028 |
| EP | 0625781 A2 | 11/1994 | ......... G11B/27/028 |
| EP | 2306750 A | 5/1997 | |
| GB | 2219170 A | 11/1989 | |
| GB | 2272127 A | 5/1994 | |
| GB | 2280778 A | 2/1995 | |
| GB | 2300535 A | 11/1996 | |
| GB | 2312078 A | 10/1997 | ......... G11B/27/034 |
| GB | 2295482 B | 12/1997 | ......... G11B/27/031 |

* cited by examiner

*Primary Examiner*—Huy Nguyen
(74) *Attorney, Agent, or Firm*—Gates & Cooper LLP

(57) ABSTRACT

An image data editing system is arranged to capture source image clips at full definition in response to edit decision lists. The system conforms the captured material to produce output image clips in response to the edit decisions defined in the list used to capture the source material. Association identifiers are applied to many edit decision lists and the capturing process is configured to capture all source material for all of the edit decision lists having the same association identifier. Each associated edit decision list may be conformed independently and manipulations may be performed with reference to the captured source material. However, when many output reels are required derived from a collection of source material, it is only necessary to capture the source material once.

50 Claims, 11 Drawing Sheets

Exported EDL Output

```
TITLE SEQUENCE 0003  100  V  C   00:00:00:00  00:00:33:00  00:00:00:00  00:00:33:00  CR   ~701

;SRC  02:00:00:00  02:00:15:00  002 00:00:00:00  00:00:15:00  CR   ~702

;HINT  01:59:58:00  02:00:17:00   ~702

;SRC  06:35:14:00  06:35:32:00  003 00:00:15:00  00:00:33:00  CR   ~703

;HINT  06:35:12:00  06:35:34:00   ~704

START OF MAIN FEATURE
```

Figure 7

Exported EDL Output

1101 —⟶ ;BIN # 7

TITLE SEQUENCE 0003  100  V  C  00:00:00:00  00:00:33:00  00:00:00:00  00:00:33:00  CR
;SRC  02:00:00:00  02:00:15:00  002  00:00:00:00  00:00:15:00  CR
;HINT  01:59:58:00  02:00:17:00
;SRC  06:35:14:00  06:35:32:00  003  00:00:15:00  00:00:33:00  CR
;HINT  06:35:12:00  06:35:34:00

START OF MAIN FEATURE

*Figure 11*

EDITING IMAGE DATA

FIELD OF THE INVENTION

The present invention relates to processing image data in an on-line editing system.

BACKGROUND OF THE INVENTION

On-line editing systems are known in which edit decisions are made with reference to the original source video material. Resulting output video, usually recorded onto videotape, then provides original material for broadcast or other purposes and therefore represents the final output product.

On-line systems are required to operate at full definition and are therefore expensive, particularly if they are to facilitate all of the creative tools available to an editor. Editing directly from video tape to create an output video tape may be referred to as linear editing, given that the time taken to locate a particular position on the video tape will be dependent upon the position of the frames physically on the tape. A recent trend has been towards non-linear editing in which video clips are digitised and stored on magnetic discs. In this way, particular video frames may be selected within a clip without having to rewind the tape such that the time taken to locate a particular clip is no longer related to its position within the overall sequence of frames. This type of editing is known as non-linear editing.

Non-linear editing suites are known in which source material is captured and stored at a lower definition, usually using spatial compression techniques. Edit decisions are then made at this lower definition, in an off-line editing process, resulting in a list of decisions being made which are written to a transport medium, such as a floppy disc, using decision list protocols. The edit decision list (or EDL) is then supplied to an on-line editing suite, into which the source material is captured, this time at full resolution and an output tape is produced in response to the decisions defined in the list.

In many situations, a collection of source material is used repeatedly to produce a plurality of versions which, although different, include many mutual similarities. Under these circumstances, each individual output sequence may be considered as a completely separate unit with its own respective EDL. Consequently, when the material is loaded into an on-line editing process, it is necessary to capture the source material for each EDL and to implement the procedure as if the source materials were completely unrelated. As an alternative, it would be possible to group all of the output sequences onto a single EDL which, although facilitating the capturing process, adds further complication to the editing procedure in that the individual output will be treated as a single large output with additional measures being required to delimit the individual sequences. Furthermore, problems could be introduced if new edit lines are introduced into the EDLs, resulting in subsequent sequences being displaced such that, at the boundaries, a particular edit line would be transferred from one output clip into its neighbour.

SUMMARY OF THE INVENTION

According to a first aspect of the present invention there is provided image editing apparatus, comprising capturing means for capturing source image clips at full definition in response to edit decision lists; conforming means for producing output image clips in response to edit decisions defined in a captured list; and associating means for applying a specific bin number to a plurality of edit decision lists, wherein the capturing means is configured to capture all source material for a plurality of edit decision lists having a similar bin number; and the conforming means is configured to allow each associated edit decision list to be independently manipulated with reference to the captured source material. Preferably the source images are captured from video tape or cinematographic film. In a preferred embodiment the output image clips are written to an output tape. Preferably, the output image clips are stored on one or more magnetic discs.

Preferably, the association is implicit. The capturing means may load source material from a notional bin, defined by all source clips in the bin having a shared association number. The contents of the bin may be used by any EDL having that bin number referred to in a BIN command line. Thus, the association results from the fact that an operator has used the same bin number in more than one EDL.

According to a second aspect of the present invention there is provided a method of editing image data, wherein source images are captured as full definition data samples in response to edit decision lists and output images are produced by conforming the captured source images, comprising steps of associating a plurality of edit decision lists which refer to shared source material with reference to a bin identifier; capturing the source material with reference to edit decision lists having a similar bin reference; and manipulating individual edit decision lists with reference to the source material. Preferably, the output images are produced in response to the manipulated edit decision lists. In a preferred embodiment output edit decision lists are produced with conventional editing references to the output images and included comments referring to the source material. Preferably the encoded comments contain the bin identifier, the position of images in the source material and capture hints for capturing portions of the source material.

According to a third aspect of the present invention there is provided data conveying media having data encoded thereon representing an edit decision list having conventional references to edited video material and encoded references to a bin identifier which refers to shared source material. Preferably the data conveying material is fabricated in the form of a magnetic disc which is transportable between machines.

BRIEF DESCRIPTION OF THE DRAWINGS

FIG. 7 shows an example of an encoded edit decision list produced by the process detailed in FIG. 6, in response to the input edit decision list shown in FIG. 2;

FIG. 11 shows an example of an encoded edit decision list used by the process detailed in FIG. 10.

DETAILED DESCRIPTION OF THE PREFERRED EMBODIMENT

Figure 1:
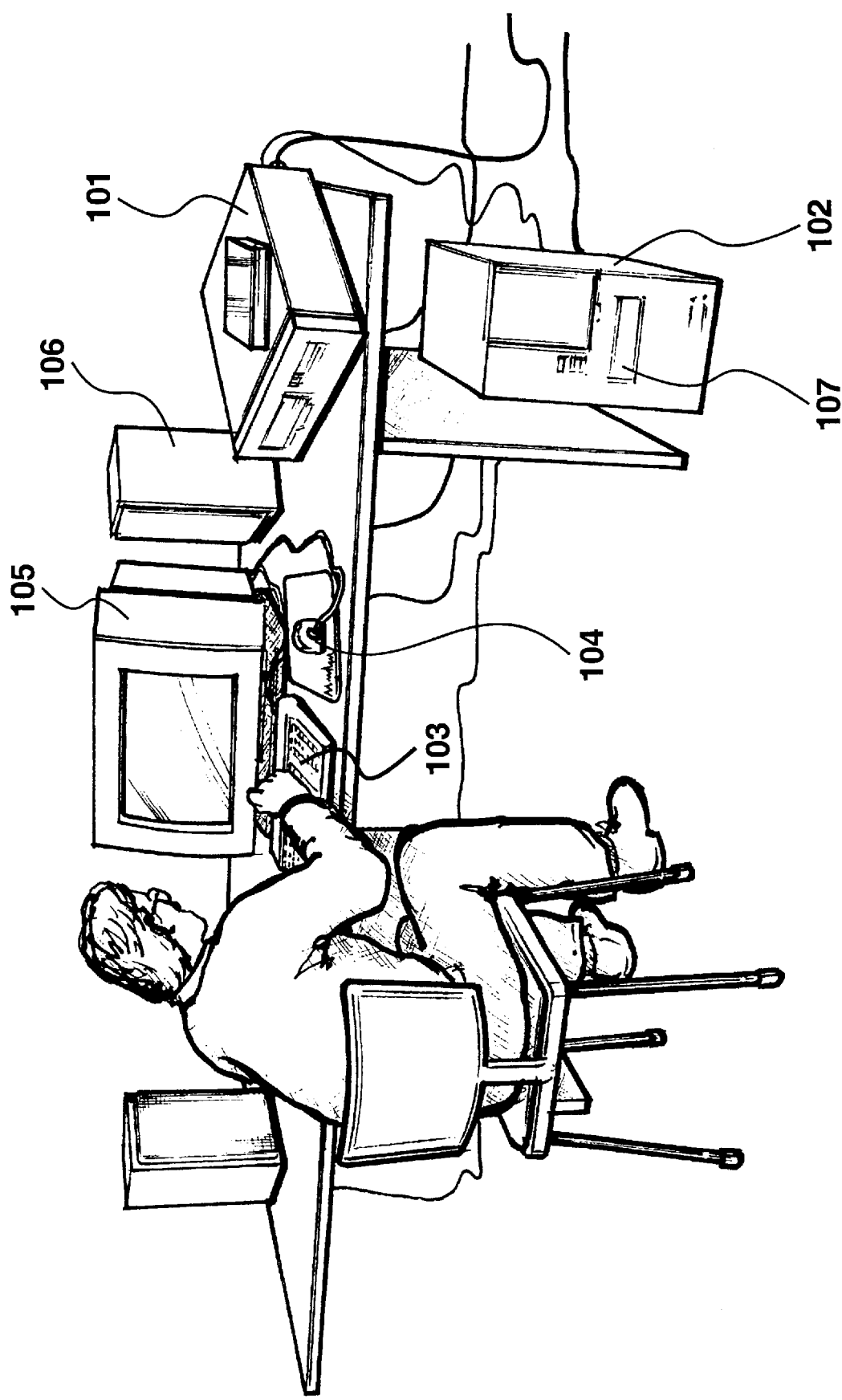
FIG. 1 shows an off-line editing suite arranged to write an edit decision list to a floppy disc.

An off line editing suite is shown in FIG. 1, in which video source material is read by a video tape recorder 101 and applied to a processing unit 102, such as an IBM PC or similar having a single hard disc system of, typically, 1.2 gigabytes. The processing unit 102 includes a video card arranged to compress input video signals and is configured to perform off-line editing manipulations in response to manual operations effected by a keyboard 103 and a mouse 104. The processing unit can also receive input images from cinematographic film when it is connected to a film player via an appropriate interface.

Compressed video frames and a graphical user interface are displayed on a visual display unit 105 and audio signals are supplied to speakers 106 via an audio digital to analogue converter.

The processing system includes a floppy disc drive 107 arranged to receive edit decision list data generated by the processing unit 102 in response to manual operations made by an operator. At the start of an editing session, an operator is required to load source material videotapes into the video tape recorder 101. Video data is captured by the off-line editing system and each input source reel is identified by a unique number. Each tape is manually referenced with an identifying number or similar which is then identified to the off-line editing system.

Within the operating environment, video clips are displayed to an operator allowing said operator to perform non-linear editing operations. Thus, much of the creative work towards producing the final result may be performed within the off-line non-linear environment where the cost of system time is substantially less than what would be incurred within an on-line full bandwidth environment.

After an operator has completed an editing procedure, the system produces an edit decision list, in response to the edits made by the operator, which is then written to a floppy disc via drive 107.

Figure 2:
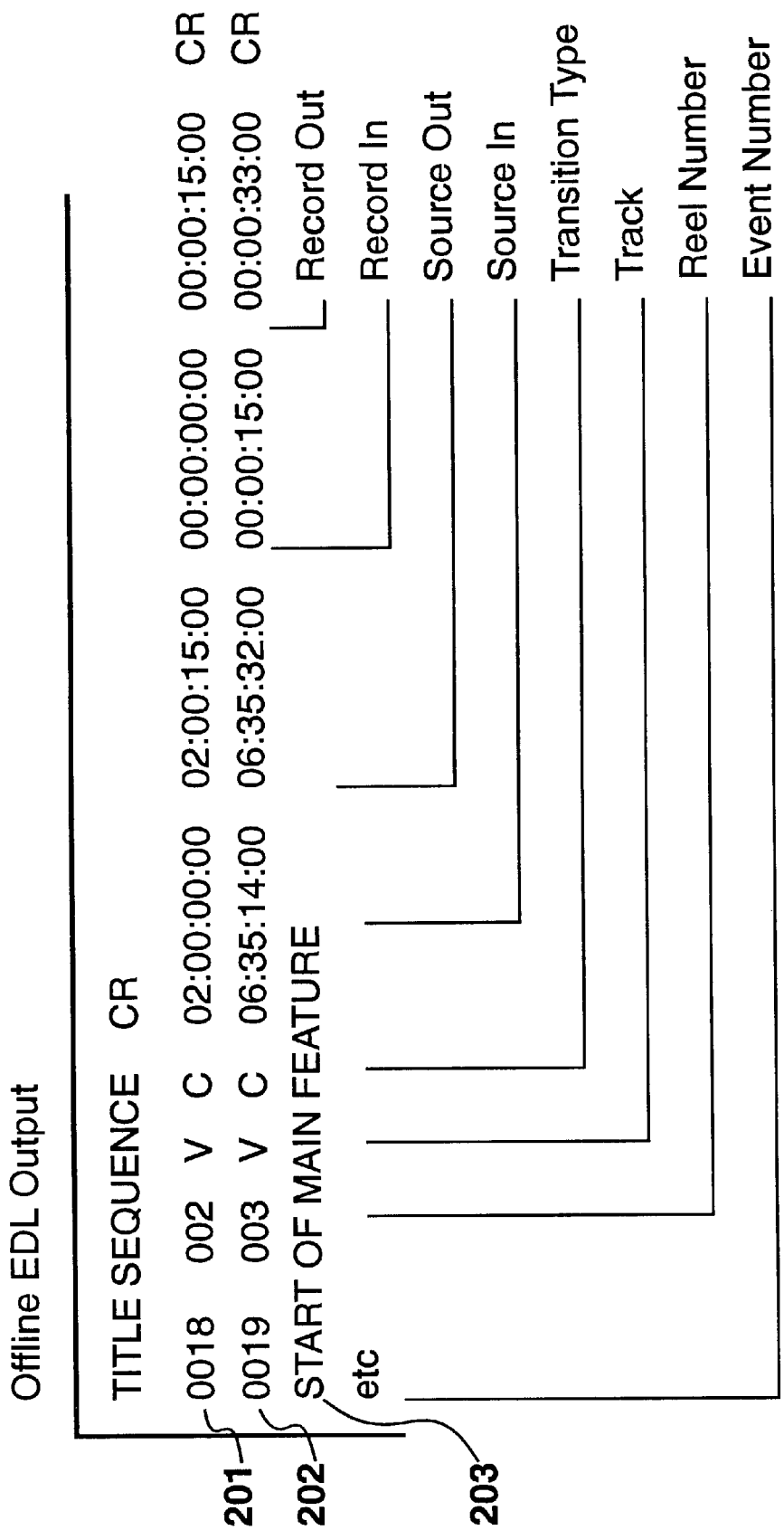
FIG. 2 represents an edit decision list of the type created by the system shown in FIG. 1.

An example of an edit decision list produced by a system of the type shown in FIG. 1, is presented in FIG. 2. The exact detail of an edit decision list format varies between different editing suites but many of the essential features of such a list are generic to most systems. The list essentially consists of a string of ASCII codes delimited by spaces and carriage return characters. As shown in FIG. 2, the list may be considered as a plurality of lines, where a line is terminated by a carriage return.

The first line of an edit decision list, such as line 201, is initiated by a number, such as 0018, representing the event number. The next number, 002 in line 201, represents a video tape reel number and this is followed by a letter identifying the track under consideration. In this environment, which is typical of its type, an output may consist of a video track with up to four audio tracks. Thus, a letter "V" at the track position represents the video track with similar letters being used to identify the audio tracks.

The next letter, a "C" in this example, represents the transition type, with the C representing a cut. A cut is the simplest of transition types and other transition types may be defined, such as dissolves and wipes etc. The transition type may also involve more sophisticated effects, possibly requiring the use of a digital video effects device whereupon the off-line system will only produce a representation of the effect with the full effect being generated during the on-line editing process.

The remainder of the line consists of four numerical time code representations. The first, 02:00:00:00, represent the source-in position. This identifies a unique frame within a source reel where the edit is to start. Thus, referring to the example, video frames are taken from the source commencing at the position defined by 02 hours, 00 minutes, 00 seconds, 00 frames. The next number represents the source out position, that is the final frame within the source clip, which has been defined as 02:00:15:00. Thus, the clip duration consists of 15 seconds of video and the total number of frames within this clip will depend upon the particular video system being used.

The next number at line 201 represent the record-in position followed by the record-out position. The difference between these values is always equivalent to the difference between the source in and out positions, in accordance with EDL convention. As this first line has the earliest start position of all the lines in the EDL, the clip is the first written to the start of the output reel, in this case, starting at position 00:00:15:00. The line is terminated by a carriage return.

The next line 202 starts with the next event number which is represented as 0019. This event takes source material from real number 003 and performs a similar cut to produce video output. Thus, frames starting at position 06:35:14:00 and running through to position 06:35:32:00 are selected and joined to the next position of the video output clip. Thus, the record-in position is 00:00:15:00 and frames are written up until position 00:00:33:00 in the output clip. This line is then terminated by a carriage return character identifying the start of the next line.

All edit decisions are initiated by an event number, as shown at line 201 and at line 202. If the line is not initiated with a number, the line is treated as being a comment. Thus, in the example shown, the next line (line 203) consists of the string "START OF MAIN FEATURE". This comment is merely to assist human operators and it is ignored by conventional on-line editing systems. Any line that is not recognised as an edit decision is treated as a comment, and is usually not acted upon by the off-line editing suite.

Figure 3:
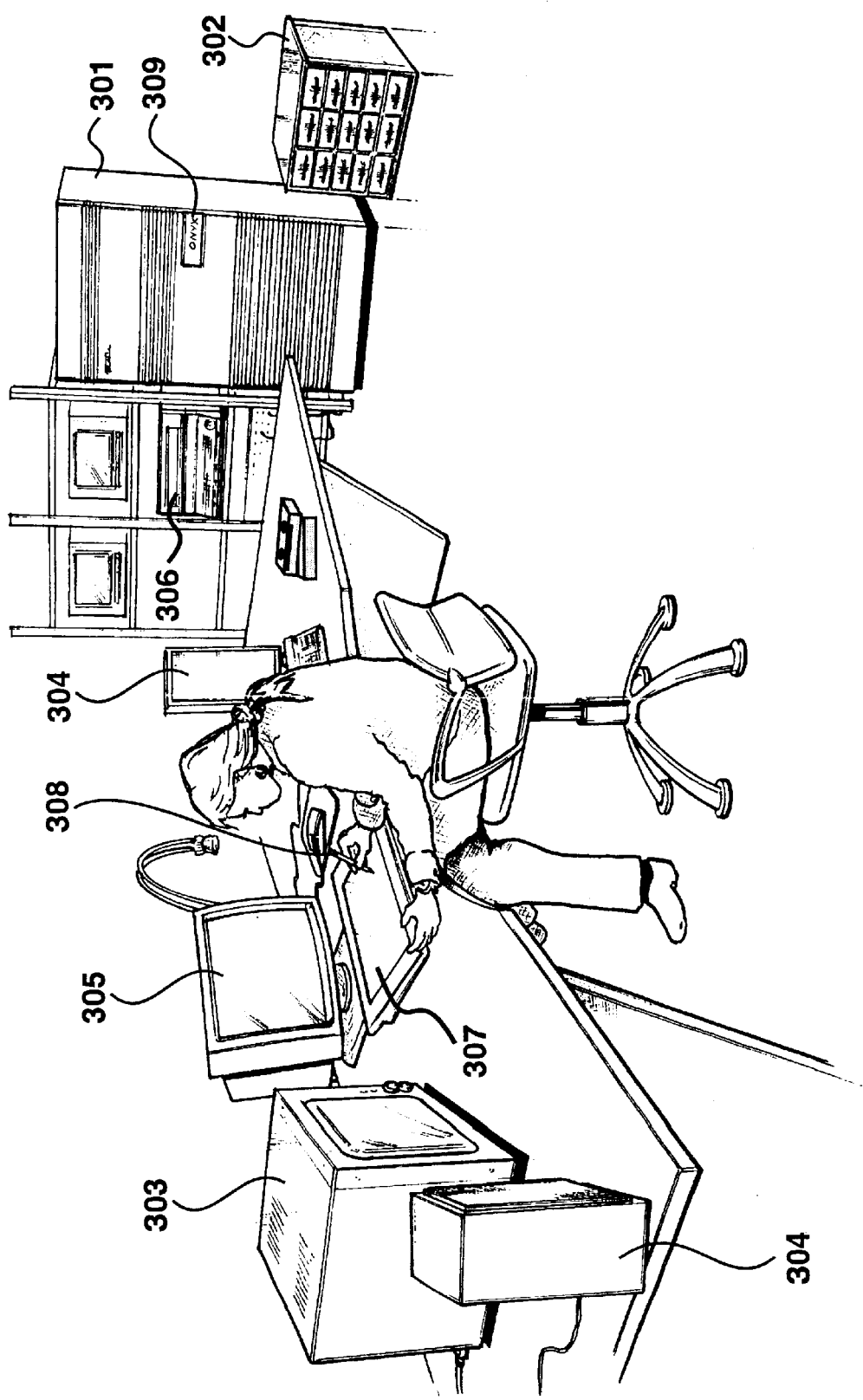
FIG. 3 shows an on-line edit suite arranged to receive the edit decision list shown in FIG. 2, including a high powered processing unit.

A digital non-linear on-line editing suite is shown in FIG. 3. In order to provide for substantially real-time processing of broadcast-quality video images, the system is provided with a substantial processing system 301, such as an Onyx manufactured by Silicon Graphics Inc. The Onyx system 301 operates with an array of hard disc units 302, configured to provide at least one full bandwidth video stream at video rate by striping video images over many discs within the array 302.

Output images from system 301 are supplied to a broadcast quality video monitor 303, with audio signals being supplied to studio reference audio monitors 304. Video images are also displayable on a visual display unit 305, also configured to display graphical user interface information and to present video clips in a graphical format so that editing decisions may be made. System 301 also communicates with a digital broadcast quality video tape recorder 306 and a graphics tablet 307. In addition to providing for the transmission of video signals from the video tape recorder 306 and back to said video tape recorder, control system 301 also interfaces with an RS422 control port on the video tape recorder such that operations of the video tape recorder may be controlled in response to manual operations of a stylus 308 upon the graphics tablet 307 and in response to edit decisions supplied to the control system 301 in the form of an edit decision list, receivable on a floppy disc medium insertable within a floppy disc drive 309. As required, system 301 is also configured to communicate with external equipment, such as digital video effects machines and rotoscoping stations etc. System 301 can also receive input images from cinematographic film when it is connected to a film player via an appropriate interface.

An editing procedure may typically be initiated on an off-line system, as that shown in FIG. 1, which would result in an edit decision list being produced of the type illustrated in FIG. 2. The edit decision list, along with the original source video material, is provided to an on-line editing suite of the type illustrated in FIG. 3. The purpose of the on-line editing suite is ultimately to generate a tape suitable for broadcast or other external use. This tape is known as the record master, the conform or the assembly. The assembly is generated as a result of capturing clips from source reels of videotape, and conforming them in accordance with an EDL. Once conformed in this way, the resulting continuous sequence is stored in the hard disc array 302. Additional formatting or modification may then be performed by the processing system 301 in order to render the assembly in accordance with the needs of the destination medium. The final resulting sequence is stored as a conformed output reel.

Sometimes the operator will require an EDL based on the manipulations made in the on-line system, that have been performed in addition to the conforming operations already specified by the existing EDL. This has the advantage that the newly generated EDL will be able to reference new material generated within the on-line session, such as dissolves or more complex special effect sequences that were not specified in the original EDL. Additionally, it is also possible to generate a new output reel or reels, known as the EDL export output reel. This output reel comprises all the source material specified for the assembly. This has the convenience of combining all the source material required for an assembly onto a single or smaller number of source reels. The EDL export output reel differs from the conformed output reel, in that it contains source material with extra frames, known as "handles", before and after the record in and out points of each clip, and as such provides a useful basis for subsequent on-line edit sessions. An accompanying EDL is also generated, which specifies access and edit operations such that the fully conformed output reel may be recreated and modified. The order and duration of shots on this new EDL export output reel are unrelated to the order and duration of the shots in the final assembly; except that the accompanying EDL will reference the new source reel or reels in such a way as to correctly represent it.

Figure 4:
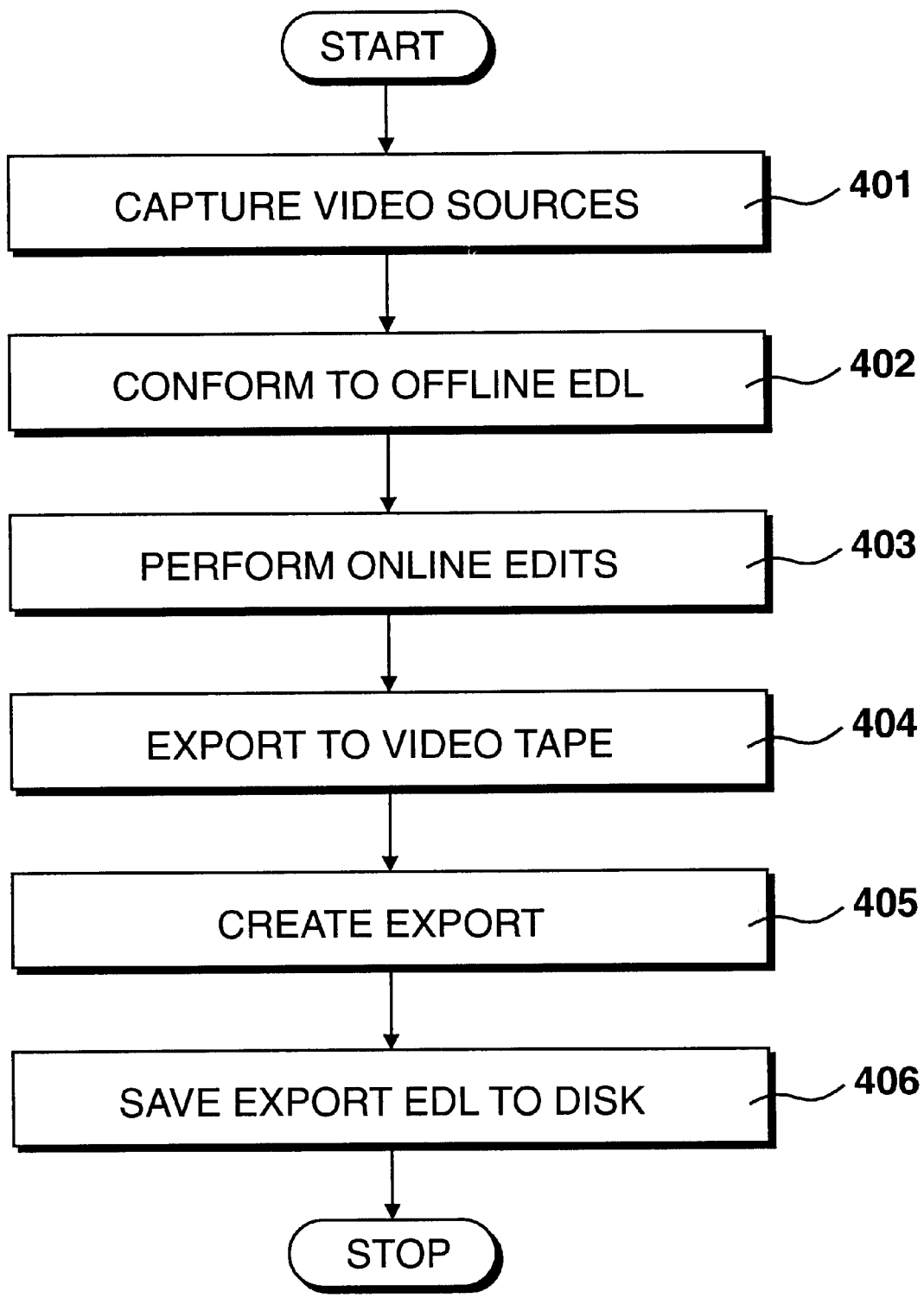
FIG. 4 identifies processes performed by the processing unit shown in FIG. 3, including a process for conforming an edit decision list and a process for creating an encoded edit decision list.

Procedures implemented within the on-line suite shown in FIG. 3 are identified in FIG. 4. At step 401 the original video source material is captured. The edit decision list defines a complete list of all video clips that are required in order to produce the final output reel. The system shown in FIG. 3 is configured to analyse this list and to produce a list of prompts to a user in response to this analysis. The capturing process 401 will involve identifying all of the clips that are required for each particular reel so that an input reel need only be loaded once into the video tape recorder 306.

The capturing process may also include optimisation routines which, for example, may result in a particular section being loaded only once in situations where the section is required more than once in the final output reel. Furthermore, it is usually assumed that further modifications will be made during the on-line editing process therefore each section will be loaded in such a way that its duration is slightly longer than what is actually defined in the edit decision list. Thus, in addition to the particular section itself, a pre-section and a post section will also be loaded, referred to as handles. Furthermore, an operator may define default handle lengths, thus, in some circumstances an operator may know that the off-line edit is more or less ideal and very little further modification is required. Under these circumstances, only relatively short handles are necessary. Alternatively, an on-line editor may be aware that an off-line edit requires substantial work therefore much larger handles may be preferable.

After all of the source material has been loaded at step 401, in response to prompts issued by system 301, system 301 performs a conforming process at step 402. This consists of analysing the edit decision list, with reference to the video sources captured at step 401, such that an output video stream may be produced, at full resolution, which conforms to the off-line edits defined in the system as shown in FIG. 1. This conforming process is controlled entirely by system 301 and does not require intervention on the part of an operator unless additional storage or other housekeeping operations are required.

In some situations the off-line editing suite shown in FIG. 1 may only be required to perform the conforming process at step 402 without any further manipulations being performed. However, in many situations the high performance on-line environment is justified on the basis that further modifications may be made at this stage. In addition, video effects, only hinted at within the off-line environment, are performed at full bandwidth definition with reference to external machines as and when required. Thus, an operator using the on-line environment shown in FIG. 3 may adjust cut positions, making use of previously loaded handles and perform compositing operations in which new video sections are derived by combining video source material and, as required, by adding new components such as graphics and video effects. Thus, after the on-line process identified at step 403, final output is written to videotape, via video tape recorder 306. The final output may consist of the conformed output reel, for broadcast or other use, or alternatively an EDL export output reel may be created, along with an associated output EDL, such that the source material may be combined onto one or a reduced number of source reels, for convenient use in subsequent editing sessions. An EDL export output reel includes sections of video material which are merely copies of frames from the original source material, along with frames which are not present within the original material and require an on-line system in order for their generation to take place.

It can be appreciated that the off-line operations described with reference to FIG. 1 do not essentially involve the editing of video material but merely involve the editing of the edit decision list. Video material continues to reside on its source tapes and a further editing operation would consist of capturing the video sources (at reduced definition) loading the edit decision list, making modifications to the edit decision list and writing the edit decision list back to disc. The very nature of the process enables the edit decision list to be very portable such that a process may be initiated at a first station, whereafter the source material and EDL disc are supplied to a second station (possibly in another country), whereupon the information is loaded and the editing process continued. Modifications could be made and the source material and disc could be returned back to the originating station for even further edits to be performed. This process could be continued for as many iterations as required without any degradation occurring and without any compatibility problems occurring. The essential point to note throughout this process is that the original source material does not change and the edit decision list continues to make reference to this source material.

The situation is somewhat different in an on-line environment such as that shown in FIG. 3. After an EDL export output reel has been generated at step 404, an export edit decision list is created at step 405 and this export EDL is then stored to disk at step 406. The export EDL, produced as an output from the on-line editing suite, includes conventional EDL references to sections of video material contained within the output tape. Thus, all of the video material is referenced in conventional EDL format using the EDL export output tape reel from the on-line system in a substantially similar way in which input tapes would be used at the start of an editing procedure. Thus, any new material generated during the on-line process can be referenced in the export EDL because reference may be made to the export reel. However, a problem arises in that each video section has been edited to its adjoining section. Therefore there is a possibility that material required for a subsequent edit session is not available in the EDL export output reel. However, this problem is overcome because the edit decision list also makes reference to the original source material from which the appropriate sections may be derived. Such references are encoded as comments within the export EDL such that the export EDL and its associated tape reel may be used in conventional suites using conventional EDL terminology. However, the system described herein decodes the encoded comments thereby enabling them to also make reference to the original source material.

Figure 5:
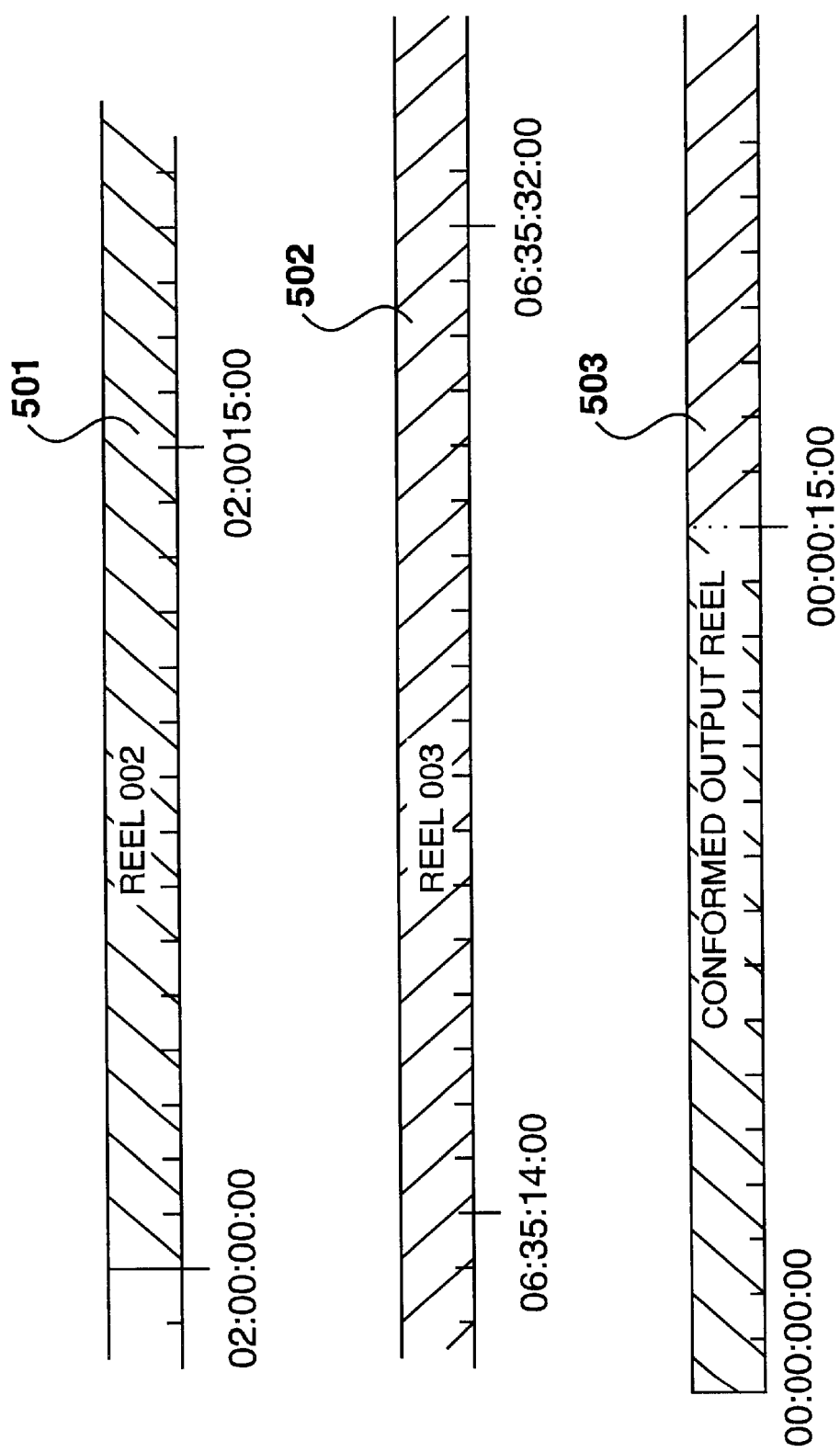
FIG. 5 shows an example of a conformed edit decision list produced in response to the process identified in FIG. 4.

An example of a conformed video reels produced by the on-line editing suite of FIG. 3 is shown in FIG. 5. As described with reference to FIG. 2, a title sequence is made up by editing a 15 second section from reel 002 with a section from reel 003, referenced as event 0018 and 0019 respectively in FIG. 2.

Reel 002 is illustrated in FIG. 5 as clip 501 with reel 003 being similarly referenced as clip 502. The resulting output reel is referenced as clip 503. The first clip 501 consists of a section starting at 02 hours 00 minutes, 00 seconds, 00 frames and running until 02 hours 00 minutes, 15 seconds, 00 frames. Thereafter, the section starting at 06 hours 35 minutes, 14 seconds, 00 frames is selected from clip 502 running to 06 hours, 35 minutes, 32 seconds, 00 frames which is then added to clip 501 in the output reel to form part of said output clip 503. Thus, clip 501 and clip 502 may be considered as part of the original source material, with clip 503 representing part of the conformed output tape.

Figure 6:
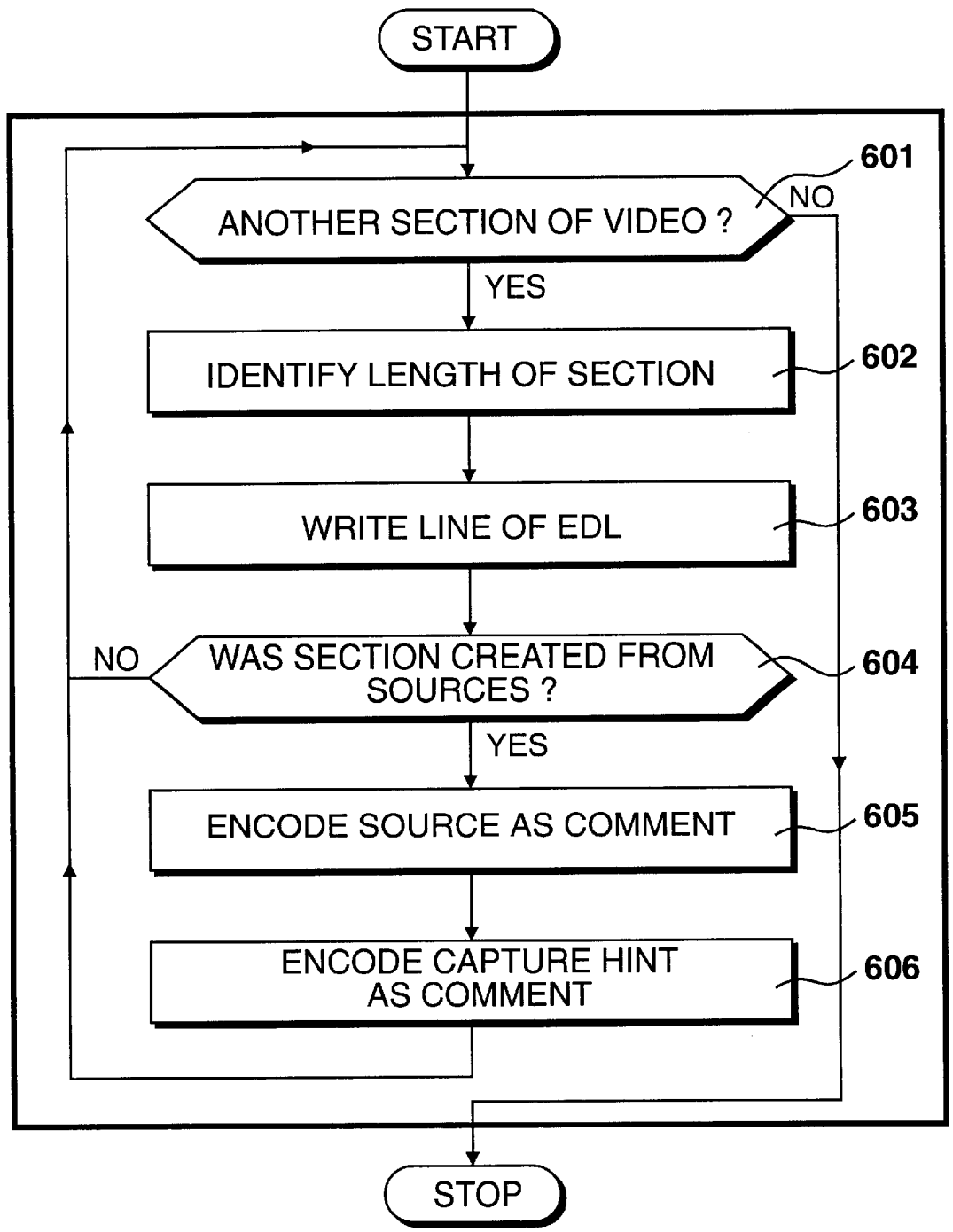
FIG. 6 details the encoded edit decision list creation process identified in FIG. 4.

Process 405 for the creation of an export edit decision list, identified in FIG. 4, is detailed in FIG. 6. At step 601 a question is asked as to whether another section of video material is present within the output reel. Each section of material in the export output reel is identified by its transition such that the export reel may be considered as consisting of a first section 501 combined with a second section 502. Thus, if the total reel included just these two sections, the first section would be identified on a first iteration of the process shown in FIG. 6 with the second section being identified on the second iteration.

At step 602 the length of the section is identified, thereby enabling a line of data to be written into the encoded edit decision list at step 603.

At step 604 a question is asked as to whether the section identified at step 602 was derived from input sources. If the section under consideration has undergone manipulation within the on-line editing system, it is not possible to derive this particular section from the original source material. Consequently, no further information may usefully be placed within the edit decision list and the question asked at step 604 is answered in the negative. Alternatively, the section identified at step 602 may be a mere copy of frames derived from the input source material. Under these circumstances, further editing procedures may be implemented with reference to the source material in preference to obtaining image frames from the output tape. The question asked at step 604 is therefore answered in the affirmative and at step 605 a further line is added to the edit decision list encoded in the form of a comment.

In order to optimise overall performance, further information is added at step 607 in the form of an encoded capture hint, thereby instructing subsequent on-line processing systems to capture video clips with specified handle lengths from the source material. Thereafter control is returned to step 601. Eventually, all of the sections present within the output video reel will have been considered, resulting in the question asked at step 601 being answered in the negative and control being directed to step 406.

The resulting export edit decision list output saved at step 406 is detailed in FIG. 7. The exported edit decision list produced from the on-line system is substantially similar to the off-line output illustrated in FIG. 2. Thus, a normal entry consists of an event number, a reel number, a track being generated (video or audio), a transition type, a source-in value, a source-out value, a record-in value and a record-out value. However, conventional entries initiated by an event number, will make reference to the edited output tape and not to the original source material. Thus, whereas the title sequence was specified by events 0018 and 0019 in FIG. 2, the whole of the title sequence may now be defined by event 0003, making reference to reel number 100 which is the number given to the output reel. A conventional editing system reading the edit decision list would interpret this event number and then proceed to the next event number, forming part of the main feature. However, as shown in FIG. 7, the on-line edit decision list also includes encoded comments from which the original edit decision list may be derived along with further hints as to the actual capturing of material from the source reels.

Event 0003 is followed by lines 701, 702, 703 and 704, each preceded by a semi-colon or other suitable code which would be ignored as a comment by conventional systems but interpreted by systems embodying the present invention. In this embodiment, a semi-colon (;) identifies a string of characters up to a carriage return as being an encoded comment, making reference to the original source material.

Line 701 consists of a semi-colon followed by the code SRC, interpreted as a source definition. The next numbers, consisting of 02:00:00:00 and 02:00:15:00 are source-in and source-out values derived from event 0018 of the original list. This is followed by numerals 002 identifying the reel number, therefore it can be appreciated that an encoded reference, such as that provided at line 701, also differs from a conventional reference in that the order of the entries is rearranged somewhat. Thereafter, references identify the record-in and record-out positions, again derived from event 0018. Line 702 specifies a capture hint in order to facilitate the reading of frames specified by source line 701. Line 702 is initiated by a semi-colon followed by the code "HINT". It comprises a source-in value 01:59:58:00 and a source-out value, 02:00:17:00, each slightly outside the source values specified at line 701. Thus, as shown in this example, two-second handles are recommended by the hint during the capture process.

Line 703 is substantially similar to line 701 with reference to information derived from event 0019. Similarly a capture hint for this source material is provided at line 704.

In the embodiment disclosed above, the conventional edit decision list information makes reference to the new video reel, with only the encoded information making reference to the originating tapes. In an alternative embodiment, the conventional edit decision list information may make reference to the originating tapes when the material has not been modified. Where the information has been modified, the conventional edit decision list instructions refers to the new output reel. The encoded data therefore only makes reference to portions of the video material which have been modified by the on-line process.

Figure 8:
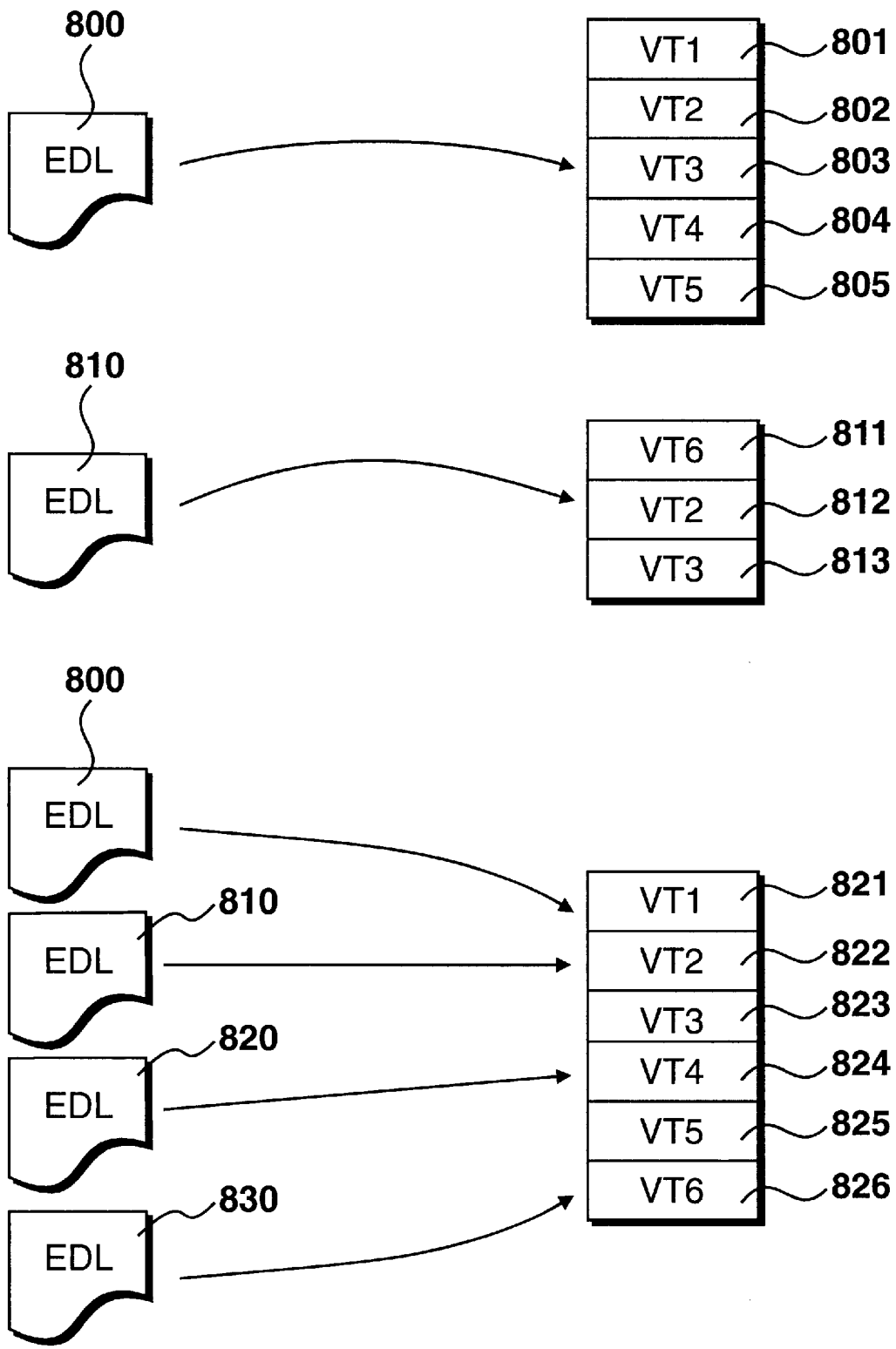
FIG. 8 illustrates situations which can arise when a processing unit such as the one shown in FIG. 3 uses a plurality of edit decision lists which require images to be captured from the same source material.

FIG. 8 of the accompanying drawings illustrates three different situations which may arise when EDL's are being used. In the first situation, an EDL 800 requires source material which is contained on five different video tapes labelled VT1 to VT5, given reference numbers 801 to 805. The human operator would be required to fetch all the video tapes from storage, physically insert each video tape into a video player, wait for the images to be captured and then physically remove and insert the next video tape. This can be a lengthy and tedious process when several video tapes are to be captured by an EDL.

In the second situation illustrated in FIG. 8, an EDL 810 requires source material from three different video tapes, labelled VT6, VT2 and VT3, given reference numerals 811 to 813. Once again the human operator must fetch all the required video tapes from storage for the image capturing to be carried out. The two video tapes VT2 812 and VT3 813 were previously used by EDL 800 for image capturing but could have been returned to storage after the process was completed, again using the human operator's time to fetch the video tapes.

In the third situation shown in FIG. 8, four EDL's 800, 810, 820 and 830 all require source material from the same six video tapes labelled VT1 to VT6, given reference numerals 821 to 826. If the image capturing for all four EDL's was carried out in sequence the human operator would not need to return the video tapes to storage and fetch the video tapes again. However, if other EDL's were used between the four EDL's 800, 810, 820 and 830, or the four EDL's were used several hours or days after each other than the problem would arise again.

One possible solution to the problem illustrated above would be for the human operator to look through all the EDL's which are to be used over a period of time, for example one day, and order the image capturing procedure such that the required video tapes would be available and not taken back to storage unnecessarily. However, this could be impractical and time consuming if a large number of image capturing procedures were to be performed and in a video editing environment jobs often have to be performed quickly at very little notice. Even if this solution was carried out, the human operator would still need to re-load the same video tapes into the video player several times.

Figure 9:
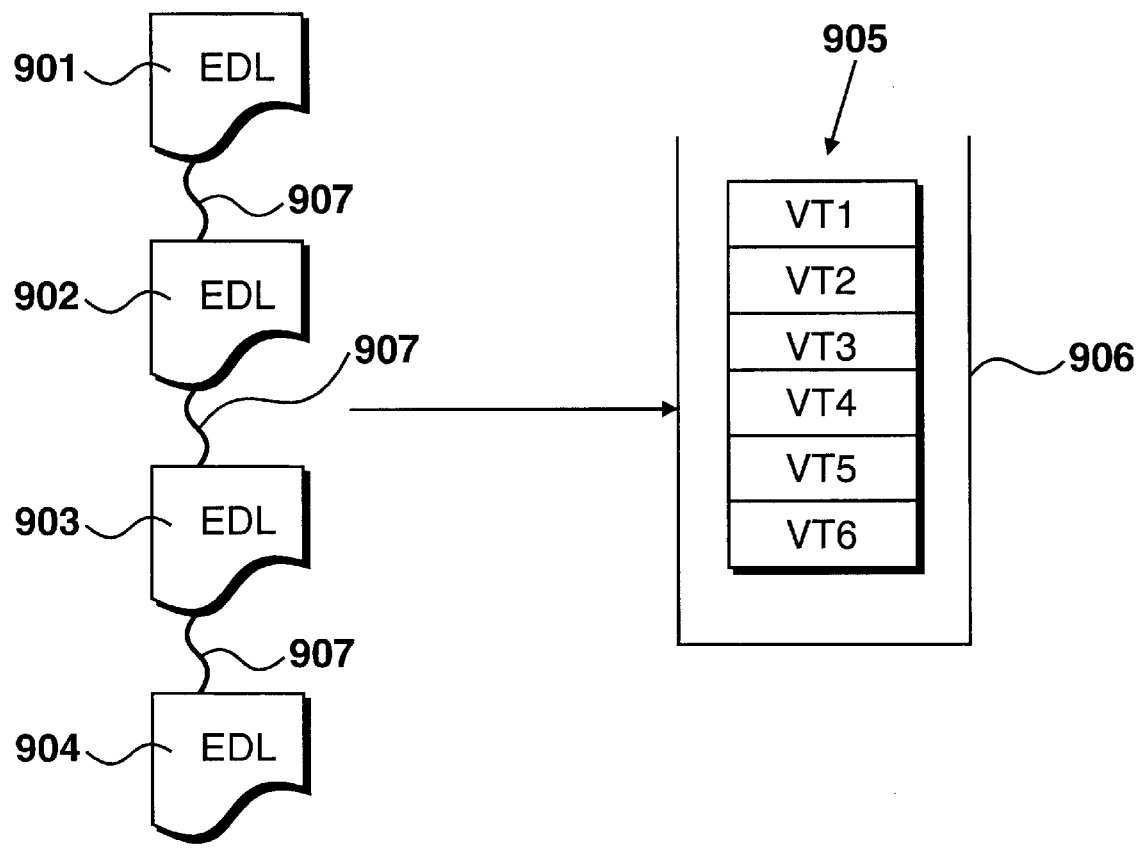
FIG. 9 illustrates an alternative method which an on-line editing suite may perform to deal with the situations illustrated in FIG. 8 by associating a common set of source material with a bin.

A solution to the above problem in accordance with the present invention is illustrated in FIG. 9. Four EDL's 901 to 904 require source material from the same set of video tapes 905. The set of video tapes 905 may be associated together in a "bin" 906. The EDL's 901 to 904 may also be associated together by logical links 907 which indicate that the EDL's require source material from the same bin 906 of video tapes.

When one of the associated EDL's, say 901, is used and image capturing is performed, the on-line suite loads the other logically linked EDL's 902, 903 and 904 and performs the image capturing procedure for those EDL's as well. This reduces the possibility of video tapes being taken back to storage unnecessarily only to be required again a while later. This method also means that the required images can be updated for two or more EDL's from a single video tape at a time without having to remove and re-insert the video tape. Any number of EDL's can be implicitly linked by having the same bin number or name referenced within each EDL. A bin can contain any number of video tapes, the limit being imposed by the memory of the available on-line suite.

Figure 10:
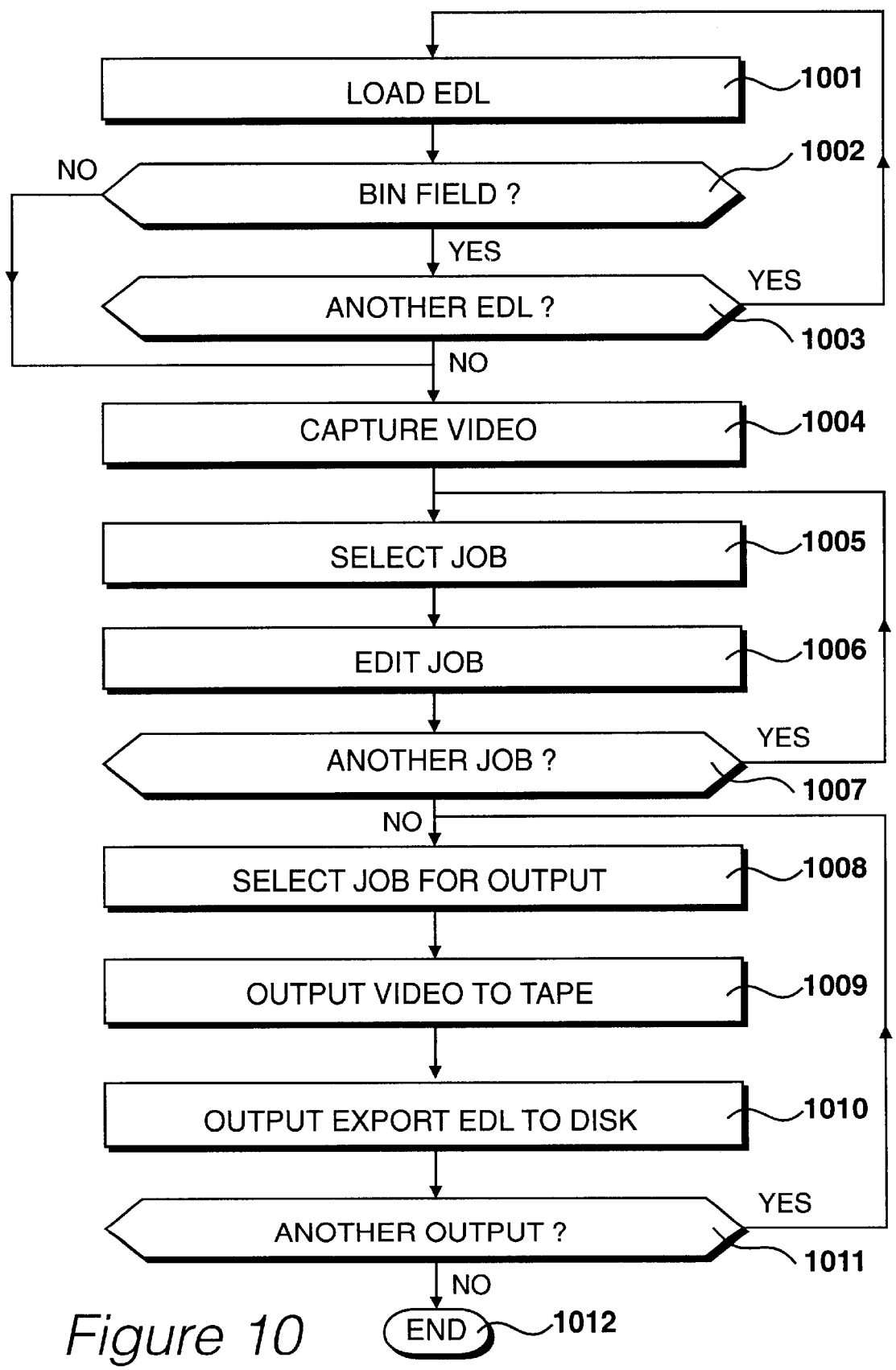
FIG. 10 illustrates steps which an on-line editing suite may perform to implement the bin method illustrated in FIG. 9.

FIG. 10 illustrates steps performed to implement EDL image capturing using the bin concept. At step 1001 an EDL is loaded for image capturing by the on-line suite. At step 1002 a question is asked whether the EDL contains a BIN field, indicating that the EDL is logically linked to one or more other EDL's which use the same bin of video tapes. If the question asked at step 1002 is answered in the negative image capturing for the EDL is carried out in a substantially conventional manner from step 1004. If the question asked at step 1002 is answered in the affirmative, then control is passed to step 1003. At step 1003 a question is asked whether another EDL is logically linked to those already loaded. If the question asked at step 1003 is answered in the affirmative then control is passed back to step 1001 in order to repeat the EDL loading process.

At step 1004 a sequence of video images is captured from a video tape in the associated bin. At step 1005 a job from one of the loaded EDL's is selected. At step 1006 the job selected at step 1005 is performed. This allows individual EDL jobs to be performed independently of the other logically linked EDL's. A question is asked at step 1007 whether another job in the loaded EDL's is to be performed, if this question is answered in the affirmative then control is passed back to step 1005. If the question asked at step 1007 is answered in the negative then control is passed to step 1008 wherein a job from the loaded EDL's which produces an output is selected. At step 1009 the output job selected at step 1008 is performed and the resulting output is written to video tape. At step 1010 the output encoded EDL is written to disc substantially according to the steps associated with step 405 of FIG. 4 above. At step 1011 a question is asked whether another output job is to be performed, if this is answered in the affirmative then control is passed back to step 1008. If the question asked at step 1011 is answered in the negative then the method terminates at step 1012.

An exported EDL incorporating the bin feature is detailed in FIG. 11. Again, a semi-colon(;) identifies a string of characters up to a carriage return as being an encoded comment. Line 1101 is initiated by a semi-colon followed by the code "BIN". This is followed by an identifier associated with a particular bin of video tapes. In line 1101 the particular bin is identified by the characters #7. It is possible that the set of video tapes associated with the bin 7 could have a similar identifier printed on a label for example. The remaining lines of information in the edit decision list shown in FIG. 11 are either conventional EDL lines or exported EDL lines for referring to and originating tape or handle length recommendations, as described above.

I claim:

1. Image editing apparatus, comprising:
   (a) capturing means for capturing source image clips recorded on one or more discrete recording media at full definition, wherein said source image clips are captured in response to data incorporated in edit decision lists;
   (b) conforming means for producing output image clips in response to edit decisions defined in said edit decision lists; and
   (c) means for associating by means of an association identifier each edit decision list with each said discrete recording media which contains source material required for each edit decision list, wherein:
      (i) said association identifier identifies and defines a set comprising a plurality of source materials required by a group of edit decision lists;
      (ii) said capturing means is further configured to capture source material identified by the association identifier for a plurality of edit decision lists having the same association identifier; and
      (iii) said conforming means is further configured to allow each associated edit decision list to be independently manipulated with reference to said captured source material.

2. Apparatus according to claim 1, wherein said source image clips are captured from video tape.

3. Apparatus according to claim 1, wherein source image clips are captured from cinematographic film.

4. Apparatus according to claim 1, wherein said association identifier is a bin number identifying a specific bin, and each bin comprises a plurality of source materials.

5. Apparatus according to claim 4, wherein said bin number is encoded within an edit decision list as a comment.

6. Apparatus according to claim 1, wherein said output image clips are written to an output tape.

7. Apparatus according to claim 6, wherein said edit decision lists contain conventional editing references to said output tape and references encoded as comments to said source image clips.

8. Apparatus according to claim 1, wherein said output image clips are stored on one or more magnetic discs.

9. Apparatus according to claim 1 including means for generating new source material.

10. Apparatus according to claim 1 including means for manipulating said captured source material.

11. A method of editing image data, wherein source images carried by a plurality of discrete recording media are captured as full definition data samples in response to edit decision lists and output images are produced by conforming said captured source images, comprising:
    associating an association identifier with each edit decision list in a group of edit decision lists, wherein said association identifier identifies a set comprising a plurality of source materials that includes source material required by each edit decision list in said group;
    capturing said source material identified by the association identifier wit reference to each edit decision lists having the same association identifier so that each discrete recording medium need only be loaded once into a player; and
    manipulating individual edit decision lists with reference to said source material.

12. A method according to claim 11, wherein said output images are produced in response to said manipulated edit decision lists.

13. A method according to claim 12 wherein output edit decision lists are produced with conventional editing references to said output images and encoded comments referring to said source material.

14. A method according to claim 13, wherein said encoded comments contain said identifier.

15. A method according to claim 13 wherein said encoded comments include the position of images in said source material.

16. A method according to any of claim 13, wherein said encoded comments include capture hints for capturing portions of said source material.

17. A method according to claim 16, wherein said capture hints include handles effectively extending the duration of a clip beyond that included within said edit decision lists.

18. A data conveying media for storing on edit decision list used by an editing system to edit image data, comprising:
    an edit decision list, stored on the data conveying media and containing conventional references and an associated encoded reference, for use by the editing system in editing image data using the conventional references to identify edited video material and using the encoded reference to identify an association identifier that identifies a set comprising a plurality of source materials required by the edit decision list to be captured for editing by the editing system, wherein:
    a plurality of edit decision lists have the same association identifier whereby;
    each video carrier need be loaded only once in respect of the said plurality of EDLs which require the seine clip from that said video carrier thereby obviating the need to load a particular video carrier more than once into a player in the case where at least two of said EDLs requires material from the same video carrier;
    said editing system produces output image clips in response to edit decisions defined in said edit decision lists; and
    said editing system allows each associated edit decision list to be independently manipulated with reference to said captured source materials.

19. Data conveying media according to claim 18, wherein said encoded references include references to source video material.

20. Data conveying media according to claim 18, wherein said encoded references include capture hints for including source material.

21. Data conveying material according to claim 18, fabricated in the form of a magnetic disc.

22. Data conveying media according to claim 21, wherein said magnetic disc is transportable between machines.

23. Apparatus according to claim 2, wherein said output image clips are written to an output tape.

24. Apparatus according to claim 3, wherein said output image clips are written to an output tape.

25. Apparatus according to claim 4, wherein said output image clips are written to an output tape.

26. Apparatus according to claim 5, wherein said output image clips are written to an output tape.

27. Apparatus according to claim 2, including means for generating new source material.

28. Apparatus according to claim 3, including means for generating new source material.

29. Apparatus according to claim 4, including means for generating new source material.

30. Apparatus according to claim 5, including means for generating new source material.

31. Apparatus according to claim 6, including means for generating new source material.

32. Apparatus according to claim 7, including means for generating new source material.

33. Apparatus according to claim 8, including means for generating new source material.

34. Apparatus according to claim 2, including means for manipulating said captured source material.

35. Apparatus according to claim 3, including means for manipulating said source material.

36. Apparatus according to claim 4, including means for manipulating said captured source material.

37. Apparatus according to claim 5, including means for manipulating said captured source material.

38. Apparatus according to claim 6, including means for manipulating said captured source material.

39. Apparatus according to claim 7, including means for manipulating said captured source material.

40. Apparatus according to claim 8, including means for manipulating said captured source material.

41. Apparatus according to claim 9, including means for manipulating said captured source material.

42. A method according to claim 14 wherein said encoded comments include the position of images in said source material.

43. A method according to claim 14, wherein said encoded comments include capture hints for capturing portions of said source material.

44. A method according to claim 15, wherein said encoded comments include capture hints for capturing portions of said source material.

45. A method of compiling a plurality of video outputs using a plurality of edit decision lists (EDLs) and a plurality of discrete media carriers of source video data which method comprises:
- (a) treating the plurality of EDLs as a first batch by providing the plurality of EDLs with means for associating the plurality of EDLS together;
- (b) identifying all the discrete media carriers that incorporate at least one video clip that is required by at least one of said plurality of EDLs;
- (c) treating the thus identified carriers as a second batch by providing association identifiers for associating the identified carriers together in a virtual bin;
- (d) compiling a plurality of video outputs on the basis of each of said plurality of EDLs by incorporating clips from one or more of the said identified carriers whereby
- (e) each identified media carrier need be loaded only once in respect of the said plurality of EDLs which require the same clip from that said identified media carrier thereby obviating the need to load a particular identified media carrier more than once into a player in the case where at least two of said EDLs requires material from the same identified media carrier.

46. A method of producing output edit decision lists (EDLs) from a plurality of discrete media carriers of source video data which method comprises:
- (a) treating a plurality of EDLs as a first batch by providing the plurality of EDLs with means for associating the plurality of EDLs together;
- (b) identifying all the discrete media caters that incorporate at least one video clip that is required by at least one of said EDLs;
- (c) treating the thus identified carriers as a second batch by providing association identifiers for associating the identified carriers together in a virtual bin;
- (d) compiling a plurality of video outputs on the basis of each of said plurality of EDLs by incorporating clips from one or more of the said identified carriers wherein each identified media carrier need be loaded only once in respect of the said plurality of EDLs which require the same clip from that said identified media carrier thereby obviating the need to load a particular identified media cattier more than once into a player in the case where at least two of said Slits requires material from the same identified media carrier; and
- (e) producing output edit decision lists with conventional editing references to said video outputs and encoded comments referring to said source video data.

47. A method as claimed in claim 46 in which said encoded comments contain any from the group consisting of:
- (i) an association identifier to identify the said virtual bin that includes source material required by each EDL which is associated with that virtual bin;
- (ii) the position of images in said source video material;
- (iii) capture hints for capturing portions of said source video material;
- (iv) capture limits which include handles effectively extending the duration of a dip beyond that included with said EDL.

48. Apparatus for compiling a plurality of video outputs using a plurality of edit decision lists (EDLs) and a plurality of discrete media carriers of source video data which apparatus comprises:
- (a) means for treating the plurality of EDLs as a first batch by providing the plurality of EDLs with means for associating the plurality of EDLs together,
- (b) means for identifying all the discrete media carriers that incorporate at least one video clip that is required by at least one of said EDLs;
- (c) means for treating the thus identified carriers as a second batch by providing association identifiers for associating the identified carriers together in a virtual bin;
- (d) means for compiling a plurality of video outputs on the basis of each of said plurality of EDLs by incorporating clips from one or more of the said identified carriers whereby
- (e) each identified media carrier need be loaded only one in respect of the said plurality of EDLs which require the same clip from that said identified media carrier thereby obviating the need to load a particular identified media carrier more than once into a player in the case where at least two of said EDLs requires material from the same identified media carrier.

49. Apparatus for producing output edit decision lists (EDLs) from a plurality of discrete media carriers of source video data which apparatus comprises:
- (a) means for treating a plurality of EDLs as a first batch by providing the plurality of EDLs with means for associating the plurality of EDLs together;
- (b) means for identifying all the discrete media carriers that incorporate at least one video clip that is required by at least one of said EDLs;
- (c) means for treating the thus identified carriers as a second hatch by providing association identifiers for associating the identified carriers together in a virtual bin;

(d) means for compiling a plurality of video outputs on the basis of each of said plurality of EDLs by incorporating clips from one or more of the said identified carriers whereby (e) each identified media carrier need be loaded only one in respect of the said plurality of EDLs which require the same clip from that said identified media carrier thereby obviating the need to load a particular identified media carrier more than once into a player in the case where at least two of said EDLs requires material from the same identified media carrier; and (f) means for producing output edit decision lists with conventional editing references to said video outputs and encoded comments referring to said source video data.

50. Apparatus as claimed in claim 49 in which said encoded comments contain any from the group consisting of:

(i) an association identifier to identify the said virtual bin that includes source material required by each EDL which is associated with that virtual bin;

(ii) the position of images in said source video material;

(iii) capture hints for capturing portions of said source video material;

(iv) capture limits which include handles effectively extending the duration of a clip beyond that included with said EDL.

* * * * *

UNITED STATES PATENT AND TRADEMARK OFFICE
CERTIFICATE OF CORRECTION

PATENT NO. : 6,571,051 B2
DATED : May 27, 2003
INVENTOR(S) : Charles Savoie

It is certified that error appears in the above-identified patent and that said Letters Patent is hereby corrected as shown below:

Column 11,
Line 34, after "wherein" insert -- said --; and
Line 64, "wit" should read -- with --.

Column 12,
Line 21, "on" should read -- an --; and
Line 35, "seine" should read -- same --.

Column 13,
Line 65, "caters" should read -- carriers --.

Column 14,
Line 65, "hatch" should read -- batch --.

Signed and Sealed this

Seventh Day of October, 2003

JAMES E. ROGAN
*Director of the United States Patent and Trademark Office*